United States Patent
Patel et al.

(10) Patent No.: US 10,096,053 B2
(45) Date of Patent: Oct. 9, 2018

(54) CLOUD SOLUTIONS FOR ORGANIZATIONS

(71) Applicant: COX COMMUNICATIONS, INC., Atlanta, GA (US)

(72) Inventors: Dipan Patel, Atlanta, GA (US); Lisa Maree Woods, Atlanta, GA (US); Jeffrey W. Thorburn, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 825 days.

(21) Appl. No.: 14/072,786

(22) Filed: Nov. 5, 2013

(65) Prior Publication Data

US 2014/0129389 A1    May 8, 2014

Related U.S. Application Data

(60) Provisional application No. 61/722,647, filed on Nov. 5, 2012.

(51) Int. Cl.
| | |
|---|---|
| G06Q 30/00 | (2012.01) |
| G06Q 30/06 | (2012.01) |
| H04L 12/24 | (2006.01) |
| H04L 29/08 | (2006.01) |

(52) U.S. Cl.
CPC ..... *G06Q 30/0625* (2013.01); *H04L 41/5051* (2013.01); *H04L 41/5096* (2013.01); *H04L 67/10* (2013.01)

(58) Field of Classification Search
CPC ...................................................... G06Q 30/00
See application file for complete search history.

(56) References Cited

U.S. PATENT DOCUMENTS

| | | | |
|---|---|---|---|
| 2012/0016778 A1* | 1/2012 | Salle ............... | G06F 9/5072 705/27.1 |
| 2013/0204972 A1* | 8/2013 | Russell .............. | H04W 4/02 709/217 |

* cited by examiner

*Primary Examiner* — Russell S Glass
(74) *Attorney, Agent, or Firm* — Eversheds Sutherland (US) LLP

(57) ABSTRACT

Aspects of the disclosure relate to generation of cloud solutions tailored to an organization or an environment thereof. In one aspect, the cloud solution bundles a group of cloud services that can include software applications, professional services, managed network services, and/or infrastructure services. The cloud services that can form a cloud solution can be selected in response to a query associated with an organization or an environment thereof.

20 Claims, 12 Drawing Sheets

FIG. 6

CLOUD SOLUTIONS FOR ORGANIZATIONS

CROSS-REFERENCE TO RELATED APPLICATION

The present application is related to and claims the benefit of U.S. Provisional Application No. 61/722,647, filed on Nov. 5, 2012, the entirety of which is incorporated herein by reference.

SUMMARY

This summary presents a simplified, rather than extensive, overview of the disclosure in order to provide a basic understanding of some aspects thereof. In addition, this summary is not intended to identify key or critical elements of the disclosure or delineate any scope thereof. Instead, this summary presents certain principles of the disclosure in a simplified form as a prelude to the more extensive detailed description that is included in the present specification.

The disclosure generally relates, in certain aspects, to generation of a suite of solutions deployed (e.g., installed, tested, and/or accepted) in a cloud configuration and customized for an organization in a specific industry vertical. Such a configuration can include a group of functional elements distributed in a network, such as a wide area network. Each of the solutions in such a suite may be referred to as a cloud solution and can comprise, for example, one or more of infrastructure, software application(s), firmware application(s), a service, or a combination thereof. A cloud solution can be customized to a specific performance of the organization, where the performance can comprise organizational needs and/or organizational performance targets, such as customer retention, product market penetration, revenue goal, a combination thereof, or the like. Provided an organization and/or an environment of the organization, cloud solutions customized to the organization and/or the environment thereof can be composed to have different tiers of complexity and associated functionality. As utilized herein, an "operational environment" (or, more simply, an "environment") of the organization may refer to a feature of the organization (e.g., organization type, organization size, a combination thereof or the like) and/or a condition in which the organization operates (e.g., availability a cloud solution, market, location, target audience, time of year, a combination thereof, or the like).

In one aspect, a suite of cloud solutions can be customized to a specific organizational performance indicator, such as organizational needs or organizational performance targets (e.g., customer retention, product market penetration, churn mitigation, combination thereof, and the like). In another aspect, the suite of solutions (e.g., technology and/or business functions) can be provided as a bundle that may be accessed via a single end-user interface. Such a bundle can be readily accessed and operated and can be specifically composed (e.g., packaged) for an industry vertical.

In other aspects, the disclosure provides a solution engine for curation of cloud services and/or solutions for an organization. In the present disclosure, such services may be referred to as assets. In certain implementations, such a solution engine can identify or target a cloud solution (e.g., a software application, a business service, or an infrastructure service) to fit a specific performance of the organization. Performance of the organization may be conveyed or otherwise represented by a specific performance indicator (e.g., revenue, customer churn, etc.). As an example, the solution engine can identify a cloud solution that fits the performance indicator (e.g., a revenue goal) by translating or otherwise mapping the performance indicator into a set of one or more solutions that support or otherwise promote the organization's performance indicator to a satisfactory degree (e.g., best fit, second best fit, etc.). A degree of support, or fitness, of a specific performance can be represented by one or more metrics indicative or otherwise representative of performance changes associated with a performance indicator. In one aspect, based on a predetermined performance indicator, historical information associated with performance of industry-equivalent organizations can be utilized to identify a suitable cloud solution.

In certain solution identification scenarios, the disclosure can leverage or rely at least in part on information (e.g., data, metadata, and/or signaling) from industry-equivalent or industry-similar organizations in order to recommend desirable solution(s) for an organization. In one example implementation, a recommendation technique (e.g., a system, a process, a procedure, an algorithm, a combination thereof, or the like) can translate usage information (e.g., data, metadata, and/or signaling) into one or more recommendations on suggested solutions for organizations based on similar industries, size of business, business problems solved, a combination thereof, or the like. Fitness of one or more cloud services can be assessed or otherwise evaluated based at least in part on specific features of an organization's performance indicator. As an illustration, in an example scenario in which the organization's performance indicator comprises a revenue goal, the fitness of a cloud service for such an indicator can be represented by a metric indicative of achievement of the revenue goal. Such a metric, which can represent or otherwise indicate fitness, can be evaluated based at least on historical data for organizations similar to the organization that acquires a cloud solution comprising the measured cloud service. As another illustration, in an example scenario in which the organization's performance metric comprises mitigation of churn, the fitness of a cloud service can be represented by a metric indicative of churn reduction in similar organizations. It should be appreciated that, in one aspect, the fitness of a cloud solution (e.g., a cloud service) or a collection of cloud solutions (e.g., cloud services) can be represented by a metric indicative of performance changes associated with a performance indicator for an organization and derived from utilization of the cloud solution or the collection of cloud solutions.

The disclosure can permit, among other aspects, searching for or otherwise identifying specific cloud solutions (e.g., cloud services) that can form a bundle of cloud solutions. In addition or in the alternative, the disclosure can permit accessing one or more bundles of solutions via, for example, a cloud solutions portal or interface.

While various aspects of the disclosure are illustrated in connection with small business entities, it should be appreciated that the disclosure is not so restricted and such aspects can be applied to most any organization having a workforce (e.g., business management and employees) and that provides a service and/or a product.

Various embodiments of the disclosure can provide several advantages over conventional technologies for bundling of commercial services. One example advantage is that organizational performance indicators can be translated into a set of one or more technological solutions. Another example advantage is that that the disclosed cloud solutions, such as applications, services, infrastructures, combination thereof or the like, can be categorized as to their pertinence (e.g., applicability and/or relevance) to an organizational performance indicator, such as a business need or a business objective. Yet another example advantage is that the disclosed curation techniques (e.g., system(s), process(es), procedure(s), combination thereof, and the like) can provide a list of pertinent solutions (e.g., most pertinent solution(s), second most pertinent solution(s), and the like) to fit a specific organizational performance indicator (e.g., a business need, a business objective, an information technology (IT) need, a combination thereof, or the like). Still another example advantage is information (e.g., data, metadata, and/or signaling) indicative of cloud solution usage can be accessed (e.g., collected) and/or utilized to develop business intelligence on what solutions are being utilized and how often they are utilized by an organization (e.g., a small business entity). A further example advantage is that access can be provided to specific cloud solutions without an organization or organization officer having an understanding of the technological nature or peculiarities of a specific cloud solution, thus making curation of a cloud solution relevant to the organization or the organization officer regardless of the technological expertise thereof.

Other features and/or advantages of the disclosure will be set forth in part in the description which follows, and in part will be apparent from the description, or may be learned by practice of the disclosure. Certain features and/or advantages of the disclosure may be realized and attained by means of the elements and combinations particularly pointed out in the appended claims. It is to be understood that both the foregoing general description and the following detailed description are exemplary and explanatory only and are not restrictive of the present disclosure.

BRIEF DESCRIPTION OF THE DRAWINGS

The accompanying drawings are an integral part of the disclosure and are incorporated into the subject specification, and illustrate example embodiments of the disclosure. The drawings in conjunction with the summary, description, and claims serve to explain various principles, features, or aspects of the disclosure.

FIGS. 4-6 illustrate an example GUI in accordance with one or more aspects of the disclosure.

FIG. 9 illustrates an example computing environment that can implement functionality in accordance with one or more aspects of the disclosure.

DETAILED DESCRIPTION

Figure 1A:
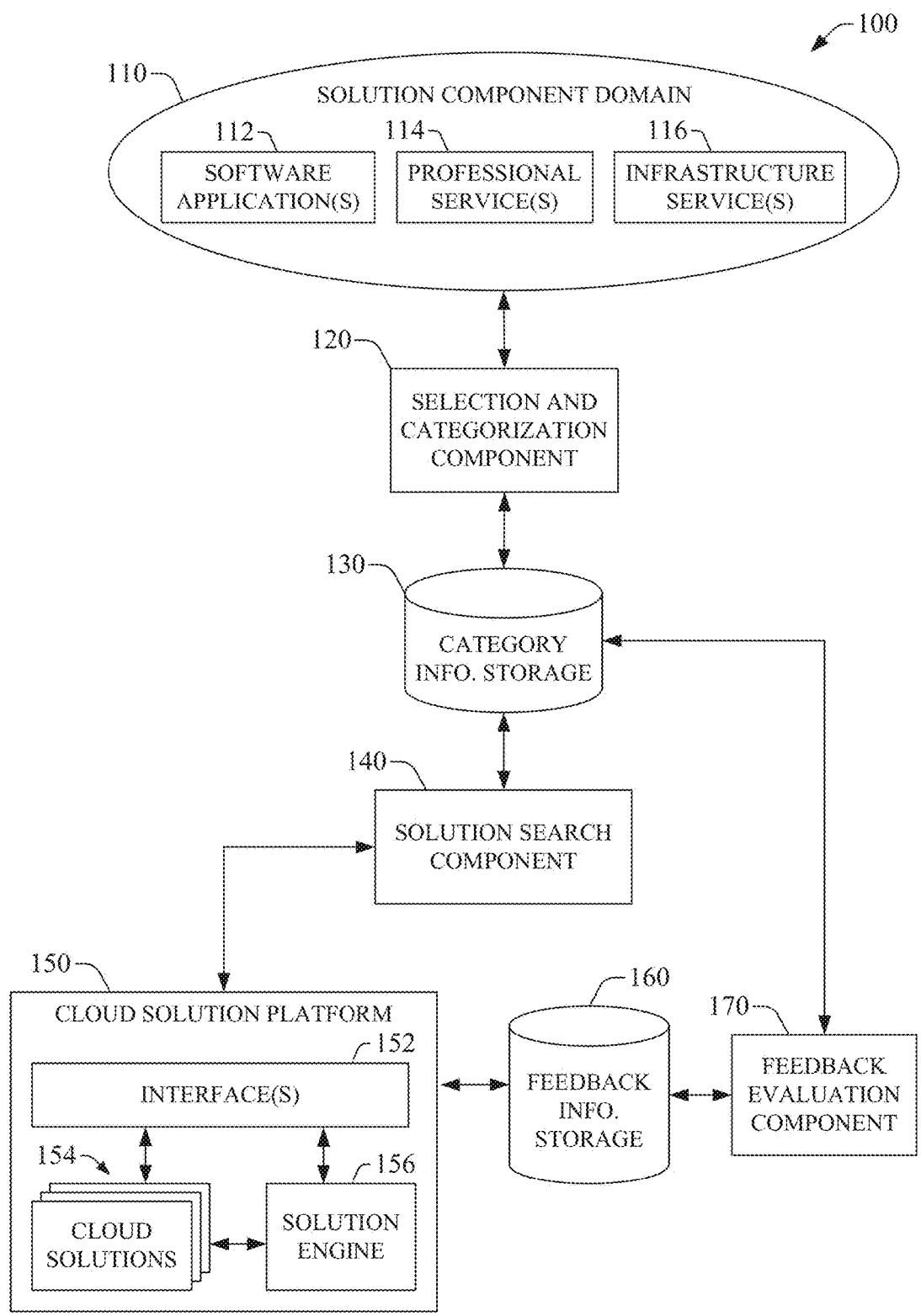
FIG. 1A illustrates an example operational environment for asset curation and/or generation of a cloud solution in accordance with one or more aspects of the disclosure.

As utilized in the present disclosure, the term "solution" refers to a group of one or more of an infrastructure functional element (e.g., a router, a hardware server, a computing device, a reference link, or the like), a software application, a firmware application, or a service (such as a business service or an infrastructure service). The terms "cloud solution" refer to a solution that is deployed in the cloud or a wide area network (e.g., a backbone network, a regional network, etc.). The cloud or the wide area network can comprise wireline functional elements and/or wireless functional elements (such as functional elements contained in a terrestrial wireless network or a satellite-based wireless network).

As employed in this specification, annexed drawings, and/or claims the terms "unit," "component," "system," "platform," "environment," "interface," "repository," "portal," and the like are intended to include a computer-related entity or an entity related to an operational apparatus with one or more functionalities afforded by one or more computational resources, such as processor(s), one or more memories, network connector(s), combination thereof, and the like. The computer-related entity or the entity related to the operational apparatus can be either hardware, a combination of hardware and software, software, or software in execution. One or more of such entities also may be referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing examples and related illustrations are but a few examples and are not intended to limiting or otherwise restrictive. Moreover, while such illustrations are presented for a unit, the foregoing examples also apply to a component, a system, a platform, an interface and the like. It is noted that in certain embodiments, or in connection with certain aspects or features thereof, the terms "unit," "component," "system," "platform," "environment," "interface," "repository," and "portal" can be utilized interchangeably.

Throughout the present specification and drawings of the disclosure, the words "comprise," "include," and "have" and variations of such words, such as "comprising" and "comprises," "including" and "includes," "having" and "has," mean "including but not limited to," and are not intended to exclude, for example, other systems, subsystems, components, action, steps, or the like. When utilized, the term "exemplary" refers to "an example of" and is not intended to convey an indication of a preferred or ideal embodiment, entity, feature, or the like. "Such as" is not utilized in the present disclosure in a restrictive sense, but rather it is put forward for explanatory purposes.

Disclosed are functional elements, such as components, units, platforms, repositories, etc., that can be utilized to perform the disclosed methods and systems. These and other functional elements are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The methods, systems, solutions, and the like, of the disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Functionality of the embodiments of is described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates an example operational environment 100 for composition of cloud solutions in accordance with one or more aspects of the disclosure. The example operational environment 100 includes a solution component domain 110 having one or more cloud services that can be utilized to compose a specific cloud solution for an organization. The solution component domain 110 can be localized (e.g., deployed in a local area network (LAN)) or distributed over a network (e.g., a wide area network (WAN), such as the Internet). The organization can pertain to an industry vertical that can be embodied in or can comprise (i) agriculture; (ii) education and childcare; (iii) insurance services; (iv) Internet and online market; (v) not-for-profit; (vi) retail and consumer services; (vii) utilities; (viii) banking and financial services; (ix) hospitality and travel services; (x) legal services; (xi) law enforcement; (xii) media and entertainment; (xiii) real estate and property; (xiv) transportation and logistics; (xv) construction; (xvi) energy and environment; (xvii) healthcare and pharmaceuticals; (xviii) manufacturing and engineering; (xix) public sector; (xx) gastronomy services; (xxi) small businesses; or the like. In addition, small businesses or medium businesses also can be organized in business verticals or segments, such as auto dealer; auto repair or workshop; general contractor; landscaping and land management; customer loyalty; consumer goods distribution; good distribution; franchise management; funeral industry; jewelry store management; pharmacy; photographic studios; salons; service dispatch; restaurants; personal services; office services; small office; home office; and the like.

Figure 1B:
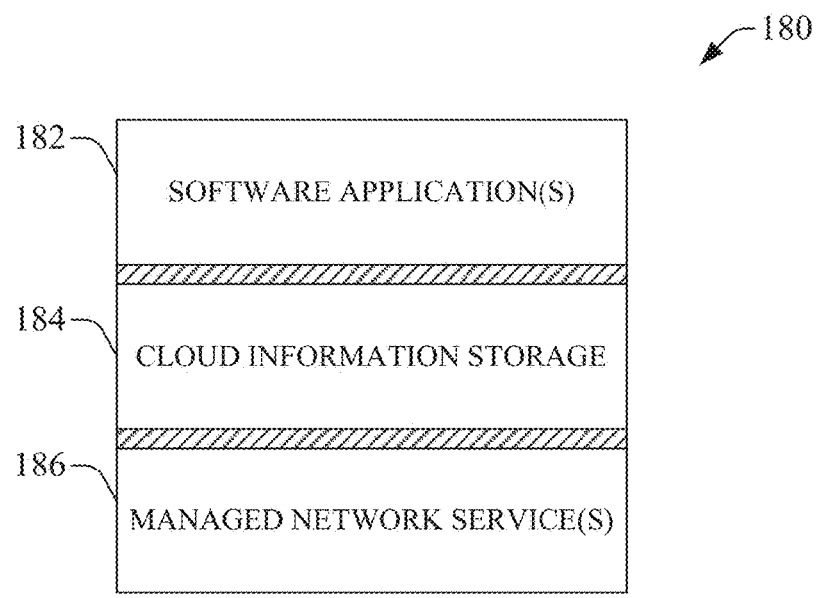
FIG. 1B illustrates an example of a solution stack for a cloud solution in accordance with one or more aspects described herein.

A cloud service in the solution component domain 110 can be developed by a service provider (e.g., a multiple operating services (MOS) provider) that administers at least a portion of the functionality of the present disclosure, or by an entity (e.g., a vendor) that is external to or otherwise independent from the service provider. In one aspect, the service provider or the entity can access information from an industry vertical specialist (which also may be referred to, more informally, as "industry guru") or a platform associated therewith in order to develop a cloud service. For instance, in a scenario in which the industry vertical is embodied in or comprises gastronomy services (e.g., restaurants or catering), the industry guru can provide at least a portion of the information. Such information may be referred to as service development information and, in one aspect, can permit or otherwise facilitate development of the cloud service. In another aspect, at least a portion of the service development information can permit or otherwise facilitate acquisition (e.g., selection, purchase, licensing, a combination thereof, or the like) of a cloud service. As illustrated, in one aspect, such cloud services can comprise one or more software applications 112, one or more professional services 114 (e.g., business services; managed service(s), such as network managed service(s); a combination thereof, or the like), and one or more infrastructure services 116. A professional service of the professional service(s) 114 can include services that permit customization and/or configuration of cloud service to an organization. In addition or in the alternative, can generate and/or distribute knowledge or intelligence associated with or otherwise related to the organization or an operational condition thereof, or another organization that is similar to the organization. A cloud service can be represented in as a "service stack," which is illustrated in FIG. 1B. A service stack 180 can comprise a first layer 182 that can comprise one or more software applications, a second layer 184 that can comprise cloud information storage (which also may be referred herein to as "networked storage"), and a third layer that can comprise one or more managed network services 186. It should be appreciated that the layer 186 can include at least one of the professional service(s) 114 and/or at least one of the infrastructure service(s) 116.

The solution component domain 110 can be accessed by a selection and categorization component 120 that can categorize a cloud service in such domain based at least in part on a fitness metric indicative or otherwise representative of industry alignment of the cloud service with an organization. In addition or in the alternative, the fitness metric can be indicative of an organization's predetermined activity (e.g., a business activity, such as payroll) that the cloud service can address (e.g., solve, monitor, audit, a combination thereof or the like). Categorization of one or more cloud services can include generation of information indicative or otherwise representative of effectiveness of a cloud service to address a specific organizational performance indicator, such as an organizational need. In addition or in the alternative, categorization of one or more cloud services can include generation of a classification of the one or more cloud services based at least in part on an environment of the organization. To at least such an end, in one aspect, the selection and categorization component 120 can determine the alignment of a cloud service of the one or more cloud services to the environment of the organization. As described herein, an "operational environment" of the organization may refer to a feature of the organization and/or a condition in which the organization operates (e.g., availability a cloud solution, market, location, target audience, time of year, a combination thereof, or the like). In certain scenarios, an organizational need can be embodied in or can comprise, for example, a business need, an information technology (IT) need, a combination thereof, or the like. The business need can range, for example, from revenue generation to cost savings functions, and can include business intelligence and analytics; finance and accounting; integrated solutions; operations management; collaboration; governance, risk, compliance; IT and communications; sales; customer management; human resources (HR) and employee management; marketing; project management and planning; or the like. The IT need can include cloud computing; middleware; security and compliance; virtualization; consulting services; development tools; service providers; system administrators; data management; hardware; mashups and application programming interfaces (APIs); or the like.

In one aspect of categorization of cloud services, the selection and categorization component 120 can generate an index of cloud services. In another aspect, the selection and categorization component 120 can retain the index of cloud services in a category information (info.) storage 130. Such an index can be retained in various memory elements, such as a register, a memory page, a file, a database, a combination thereof, or the like, in a manner that can permit determination of alignment of the cloud service to a business industry and/or a specific organizational need (e.g., business need or technological need) or other organizational performance indicator. In certain implementations, the index of cloud services can be ranked according to respective fitness metrics—e.g., a cloud service having a higher fitness metric has higher relevancy than another cloud service having a lower fitness metric.

As illustrated, the example environment 100 can include a solution search component 140 that can identify or otherwise select one or more cloud services for an organization (e.g., a business entity). In certain implementations, the solution search component 140 can identify or otherwise select the one or more cloud services based at least in part on an index of cloud services, where such an index is generated as described herein. In addition or in the alternative, the solution search component 140 can identify or otherwise select a cloud service based at least in part on an industry vertical and/or feedback information (e.g., utilization metrics, such as popularity) associated with the cloud service as measured or reported by similar organizations (e.g., small business, such as a restaurant). Similarity between organizations can be determined (e.g., quantified or otherwise assessed) based at least on one or more of geographical overlap (e.g., two organizations are located in the same region, such as a city or neighborhood); industry vertical or segment; size of organization (e.g., small business, medium business, or the like); type of organization (e.g., not-for-profit entity or for-profit entity), combinations thereof; or the like.

In one aspect, the selection and categorization component 120 can identify or otherwise select a cloud service based at least in part on a capability matrix that, in one implementation, can identify a professional service in its ability to provide a satisfactory performance (e.g., optimal performance, nearly optimal performance, or the like) with respect to one or more organizational criteria (e.g., business criteria) for an organization, such as small business. As described herein, the professional service can be embodied in or can comprise a business service, a technology service, a channel service, a vertical service, a combination thereof, or the like. In one implementation, for a small business, five business criteria can be configured: (a) attract more customers; (b) improve customer experience; (c) retain customers (or "mitigate customer churn"); and (d) improve operational efficiency. Each of such business criteria can comprise multiple components or metrics, wherein at least one (e.g., one, two, more than two, each, etc.) of the multiple components can permit measuring or otherwise evaluating effectiveness of a cloud solution (e.g., a cloud service) against a predetermined criterion. As an illustration, the "improve efficiency" criterion can include one or more of the following metrics: ability to lower need for business owner time in performing a function, ability to save employees time in performing services, ability to improve convenience and thus make a task easier; automation of tasks; delivery of business insights; and the like, as examples.

The component(s) or metric(s) within an organizational criterion can be grouped into the type of business to which such components may apply. Types of business can comprise substantially any industry vertical in which the business criteria can be defined. For example, in a hospitality vertical, the "improve customer experience" criterion can include restaurant specific components or metrics, such as shorten food ordering wait times; improve methods of bill payment; shorten time to seat, etc. In one aspect, the capability matrix can be configurable and/or extensible. Configurability and/or extensibility can permit to search for cloud services available over the Internet in accordance with aspects of the present disclosure.

In certain implementations, alignment of a cloud solution, or a cloud service thereof, to an organization performance indicator (e.g., a business need) can be determined based at least on feedback information received from an end-user of such a solution or service and/or by a third-party (e.g., a blogger or a reviewer of IT products) associated with the cloud solution, or the cloud service thereof. The feedback information can comprise information indicative of adequacy of the cloud solution, or the cloud service thereof, to a specific organization. In one aspect, such an alignment can be measured by evaluating utilization of the cloud solution, or the cloud service thereof. Utilization can be evaluated via the feedback evaluation component 170. In another aspect, such an alignment can be measured by surveying electronically the documented features of the cloud solution, or the cloud service thereof, and determining responsiveness to (e.g., level of adoption of) such a solution or service in order to categorize or to refine a categorization of the cloud service associated with the cloud solution. For example, the surveying can include surveying blogs written about the cloud service. In other implementations, such measurements can be conducted by polling social media sources or outlets (such as Facebook, Twitter, LinkedIn, web-based usage boards, or the like) and collecting, in response, information indicative of feedback from end-users of the cloud solution or the cloud service thereof. In one aspect, leveraging (e.g., polling or otherwise monitoring) social outlets to measure such alignment can permit correlating feedback (e.g., usage information) across various customers of the service provider that provides the cloud solution. Quality assurance (QA) and analysis of the magnitude of the service capability/score can be performed via comparative assessment and analysis of number of users (either inside or outside of the service provider solution, for example) according to the industry vertical for which the cloud service has been configured as an available element of a prospective cloud solution.

In certain scenarios, the selection and categorization component 120 can implement (e.g., execute) or otherwise leverage an organization-solution search process and, in response, can provide (e.g., identify, organize, identify and organize, or the like) a set of one or more cloud services (e.g., software applications, business services, infrastructure services, and the like). In one aspect, the set of one or more cloud services can be ordered or otherwise organized based at least on applicability to an end-user (e.g., business owner, organization officer, etc.), business type or organization type, time of year, and/or a specific industry event. As described herein, such an ordering can be retained in a memory element within the category information (info,) storage 130. For example, a cloud service can be identified in response to a query, such as "What services can help me attract more customers during restaurant week." It should be appreciated that, in one aspect, other queries can be formulated in order for the selection and categorization component 120 to identify or otherwise select a cloud service from the solution component domain 110. In one aspect, the selection and categorization component 120 can translate a service query into a set of one or more cloud services (e.g., software applications) suitable for a business entity or organization. As described herein, at least to identify or otherwise select cloud services, the selection and categorization component 120 can incorporate information indicative of one or more of type of industry associated with a device that originates a query, an initial categorization, or one or more of feedback metrics (e.g., utilization metrics) associated with a cloud service.

The solution search component 140 can generate a bundle of cloud services comprising one or more cloud services that are identified or otherwise selected for an organization, such as a business entity. Such a bundle represents a cloud solution for the organization. In certain implementations, software components or firmware components in a cloud service that is contained in the cloud solution can be pre-compiled for direct (or "turnkey") utilization by end-user of the organization.

The solution search component 140 can serve as a core gateway to getting services onto and categorized on a cloud solutions platform 150. A cloud solution identified by the solution search component 140 can be supplied to the cloud solutions platform 150, which can retain (e.g., install; configure; persist; install and configure; install and persist; configure and persist; or install, configure, and persist) the cloud solution in one or more functional elements referred to as cloud solution(s) 154.

The cloud solutions platform 150 also can expose, or provide access to, a cloud solution for utilization or consumption. To at least such end, in certain implementations, the cloud solution platform 150 can include a solution engine 156 and at least one interface of one or more interface(s) 152. In one aspect, the solution engine 154 can permit access to a cloud service of a cloud solution in response to receiving a request for a cloud solution from the at least one interface. In another aspect, the solution engine 156 can leverage the solution search component 140 to identify or otherwise select a specific cloud service or cloud solution, as described herein, in response to information indicative of an organizational performance indicator received from an organization (e.g., received from an organization device). As an illustration, for a business entity, the solution engine 154 can transmit an instruction to the solution search component 140 to identify a specific cloud service. The instruction can include a query having information indicative of a business requirement of the business entity. As another illustration, in certain embodiments, the solution engine 156 can execute the solution search component 140 in order to identify or otherwise select one or more cloud services to compose a cloud solution in accordance with one or more aspects described herein. In such embodiments, the solution search component 140 can be embodied in a set of one or more computer-accessible instructions (e.g., computer-executable instructions, computer-readable instructions, combination thereof, or the like) that is retained in one or more memory devices (which also may be referred to as "memory;" not depicted in FIG. 1A) that can be integrated into the solution engine 156 or functionally coupled thereto.

At least one interface of the one or more interfaces 152 can be embodied in or can comprise a user interface (UI) that can present one or more services contained in a cloud solution to an end-user (e.g. a business customer or organization officer) in a manner that permits straightforward identification and adoption of the cloud solution and related cloud services.

As a cloud solution or a cloud service thereof is utilized, usage information can be accessed (e.g., collected or received) and/or retained in a feedback information storage 160. The feedback information can be retained in unstructured format in one or more memory elements of the feedback information storage 160. In one aspect, the feedback information can comprise usage information that can be indicative of frequency of utilization of the cloud service (e.g., a software application, a professional service, a combination thereof, or the like). In another aspect, the feedback information can comprise usage information indicative of utilization of one or more functional features of an infrastructure element (e.g., a router, a switch, a gateway, or the like) that can be included in the cloud solution.

A feedback evaluation component 170 can analyze the feedback information (e.g., usage information) retained in the feedback information storage 160 and can provide insights into the popularity and/or effectiveness of a cloud solution. As part of the analysis of such feedback information, the feedback evaluation component 170 can aggregate at least a portion of the feedback information, can identify temporal patterns in such information, can identify frequency patterns in such information, and/or can extract specific features present in at least a portion of the feedback information, or the like. In certain implementations, information generated from the analysis of the feedback information (e.g., usage information) can be retained in the category information storage 130 and can be utilized to determine suitability of a cloud service for a specific cloud solution. In one aspect, the feedback evaluation component 170 can analyze past and current organization activity (e.g., business activity) associated with a cloud solution or a cloud service thereof.

In one aspect, the feedback evaluation component 170 can implement a utilization process that can collect information from at least three core usage sources, and can analyze at least a portion of such information to generate a usage score for a cloud solution or a specific cloud service thereof. The score can be associated with the specific cloud service (e.g., a software application, a business service, an infrastructure service, or the like) in a categorization database retained in the category information storage 130, and can be utilized by the solution search component 140. Example core usage sources can comprise at least the following. (1) Events and/or number of times and duration of use of a cloud service (e.g., a software application or a professional service) is used by a consumer. Usage can be assessed in accordance with (a) cloud service launch events by the consumer. (b) Duration of cloud service (e.g., software application, business service, and/or infrastructure service) usage. For example, such duration can be assessed as the time elapsed between log in and log out. (c) Type of log out (e.g., normal, time out, system error, etc.). (d) Use segmented by user role (e.g., admin, user, manager, etc.). (e) Time of day and/or day-part of usage (e.g., early morning, afternoon, evening, weekend). (f) Types of events performed by the service (e.g., number of IP security attacks stopped by managed routers, etc.). (2) External factors relating to the industry. (a) Industry specific calendars (e.g., restaurant week, public holiday, etc.). (3) Purchase cost and/or revenue associated with a cloud service (e.g., software application, business service, and/or infrastructure service). (a) Money spent with the cloud service over time. (b) Price per end-user device. (c) End-users (e.g., customers of a customer that acquires a cloud solution from a service provider) utilization of the cloud service. As described herein, such rich utilization information can be leveraged (e.g., analyzed, aggregated, etc.) in scenarios in which a suitable information (e.g., data, metadata, and/or signaling) exist. In certain scenarios, such usage data can be extracted for several cloud services.

Information obtained from the core usage sources can be utilized to determine (e.g., configure, define, compute, combinations thereof, or the like) one or more utilization metrics. The utilization metrics that can be analyzed and associated with a cloud service (e.g., software application, business service, or the like) can include various indicators, such as value for money, popularity; adoptability, and so on. For example, number or degree of cloud service utilization (see example core usage source (1)(a)) can be analyzed with respect to monies spent with the cloud service (see example core usage source (3)(a)) in order to calculate a metric and then assign a score to the cloud service.

In addition or in the alternative, the feedback evaluation component 170 can incorporate feedback information accessed from an end-user (e.g., a business owner) into the information sets (e.g., data sets and/or metadata sets) utilized to perform the usage analysis described herein. Such feedback can include, for example, one or more of responses to interviews, surveys, or free form input text boxes. Indirect feedback also can be incorporated into the analysis. For instance, indirect feedback can include information comprising one or more of number of incident tickets raised by business owner, and the status of such tickets (e.g., fixed within SLA terms, outstanding, major tickets open, combination thereof, and the like).

In certain scenarios, a utilization metric can be learned based at least on historical data indicative of past utilization success and/or failure. In one aspect, machine learning process(es) that can permit learning a new utilization metric can access (e.g., collect or receive) utilization information and scoring of a cloud service at certain discrete intervals (e.g., daily, weekly, monthly, etc.) or on a nearly-continuous basis, such information can be compared with one or more feedback feeds in order to generate a utilization metric autonomously in order to increase fidelity of the scoring of a specific cloud service.

In one aspect, a service provider that administers the operating environment 100 and provides cloud solutions in accordance with one or more aspects of the disclosure can employ utilization metrics and/or utilization data associated with one or more cloud services to develop and/or implement business strategies associated with a cloud service. For example, based on utilization metrics and utilization data, a service provider can establish a distributor agreement with a developer of a cloud service (e.g., a software application) and can collect a flat fee from the developer in order to index or categorize the cloud service and incorporate the cloud service into a cloud solution. For another example, for a cloud service with high utilization metrics (e.g., a highly adopted cloud service), the service provider can demand increased exclusivity for distribution of the cloud service in exchange of a higher agreement fee. For yet another example, the service provider can purchase the developer organization and can keep the business model of such organization and assist with further development in order to maintain a large segment of customers that utilize such cloud service.

While not illustrated, in certain embodiments, the example environment 100 can comprise a billing component that can bill an organization (e.g., a business entity) for a cloud solution based at least in part on utilization of at least one of one or more cloud services that can be included in the cloud solution. In one aspect, the business entity can be billed a fixed fee for the cloud solution. In another aspect, the business entity can be billed based at least on the organization's revenue or profit generated by the cloud solution with respect to revenue or profit of the business entity during periods in which the cloud solution is not utilized. In yet another aspect, the organization can be billed at a discounted rate or promotional rate for cloud solutions that include cloud service with low popularity or that are provided on an experimental basis. For instance, a cloud solution having a cloud service (e.g., a software application or a business service) that is on beta-testing may be billed at a discounted rate in order to entice a business owner of the business entity to test such cloud service.

It should be appreciated that, in one aspect, the cloud solution platform 150, and related one or more interfaces 152 (which may be referred to as interface(s) 152) and associated interface aspects can guide or otherwise assist a business owner or an organization officer in finding technical solutions rather than assuming the business owner or organization officer has adequate technical knowledge of each organizational function and/or technology in order to evaluate solution options and make an adequate choice unguided.

Figure 1C:
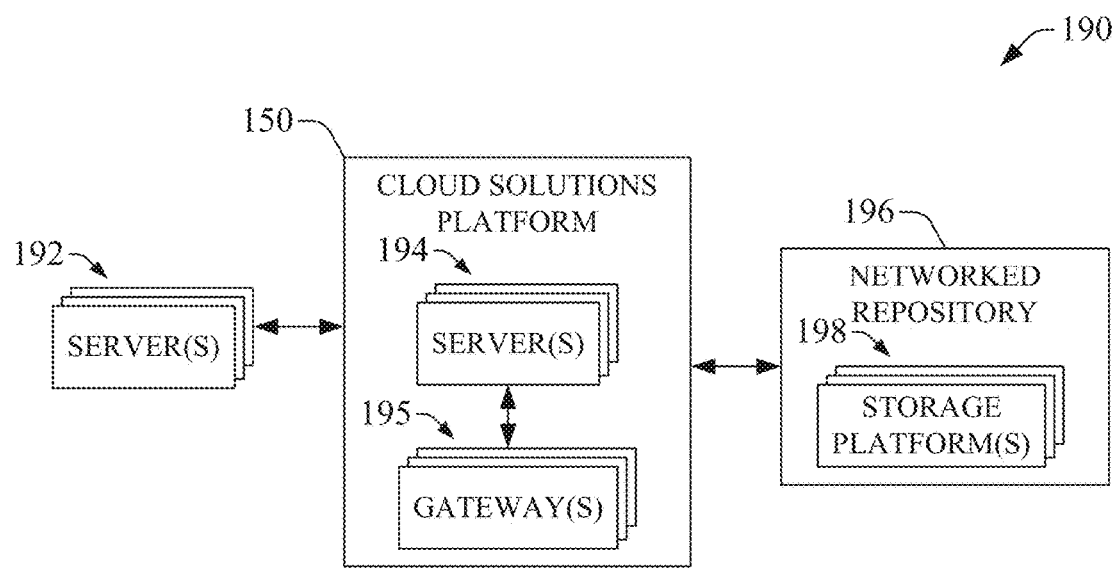
FIG. 1C illustrates another example operational environment for asset curation and/or generation of a cloud solution in accordance with one or more aspects of the disclosure.

FIG. 1C illustrates another example of an operational environment 190 for asset curation for cloud solutions and/or for composition of cloud solutions in accordance with one or more aspects of the present disclosure. As illustrated, the operational environment 190 includes the cloud solution platform 150, which can be embodied in or can comprise one or more servers 194 (referred to as "server(s) 194") and one or more gateways 195 (referred to as "gateway(s) 195). At least one server of the server(s) 194 can provide at least a portion of the functionality of the cloud solutions platform 150 described herein. In certain implementations, the at least one server can execute computer-accessible instructions (e.g., computer-readable instructions and/or computer-executable instructions) in order to implement a cloud solution of the cloud solution(s) 154. In addition, at least one of the gateway of the gateway(s) 195 can permit exchange (e.g., transmission and/or reception) of information with one or more functional elements in the operational environment 150 or functionally coupled thereto. In one aspect, at least a portion of the information that can be exchanged can comprise information associated with a cloud solution or utilization (which also may be referred to herein as "consumption") thereof, and/or feedback information related to an organization or an operational condition thereof. Information that is received at the cloud solutions platform 150 can be retained in the networked repository 196. The at least one gateway can permit exchange of information (or communication of information) between a server of server(s) 194 and at least one server external to the cloud solutions platform 150. Similarly, the at least one gateway can permit exchange of information with a networked repository 196 that can include one or more storage platform(s) 198 comprising one or more storage devices and management component(s) (e.g., server(s)) that permit access to information retained within the one or more storage devices. One or more of the storage platform(s) 198 can embody or can comprise at least one of the category info. Storage 130 or the feedback info. storage 160 in accordance with aspects described herein.

In certain embodiments, combination of a server of the server(s) 194 and a gateway of the gateway(s) 195 can embody an interface of the interface(s) 152. In other embodiments, which may be referred to as distributed embodiments, a combination of a server of the server(s) 194, a gateway of the gateway(s) 195, and a server of the server(s) 192 can embody or can comprise an interface of the interface(s) 152. In one aspect, the server of the server(s) 192 can operate as a client of the server of the server(s) 194, where the server that operates as a client can receive information indicative of an interface (e.g., a user interface) from the server of the server(s) 194 via the gateway of the gateway(s) 195. In one implementation, the server of the server(s) 192 can render at least a portion of such information and can receive other information indicative or otherwise representative of instructions that permit utilization or consumption of a cloud solution or a cloud service thereof. At least one server of the server(s) 150 can provide such a solution or service.

Figure 2:
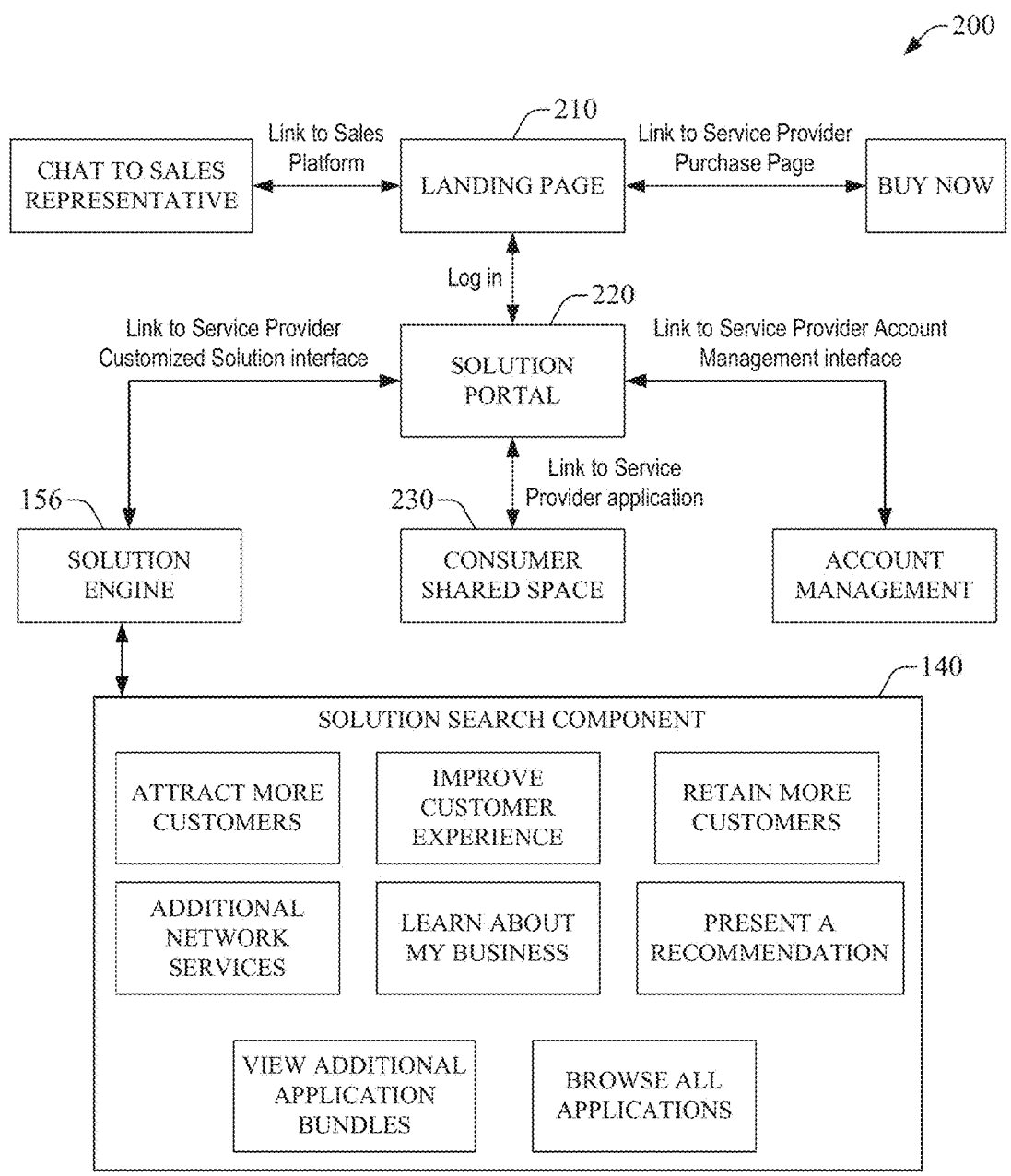
FIG. 2 illustrates a block diagram of an example operational flow of a cloud solution in accordance with one or more aspects of the disclosure.
Figure 3:
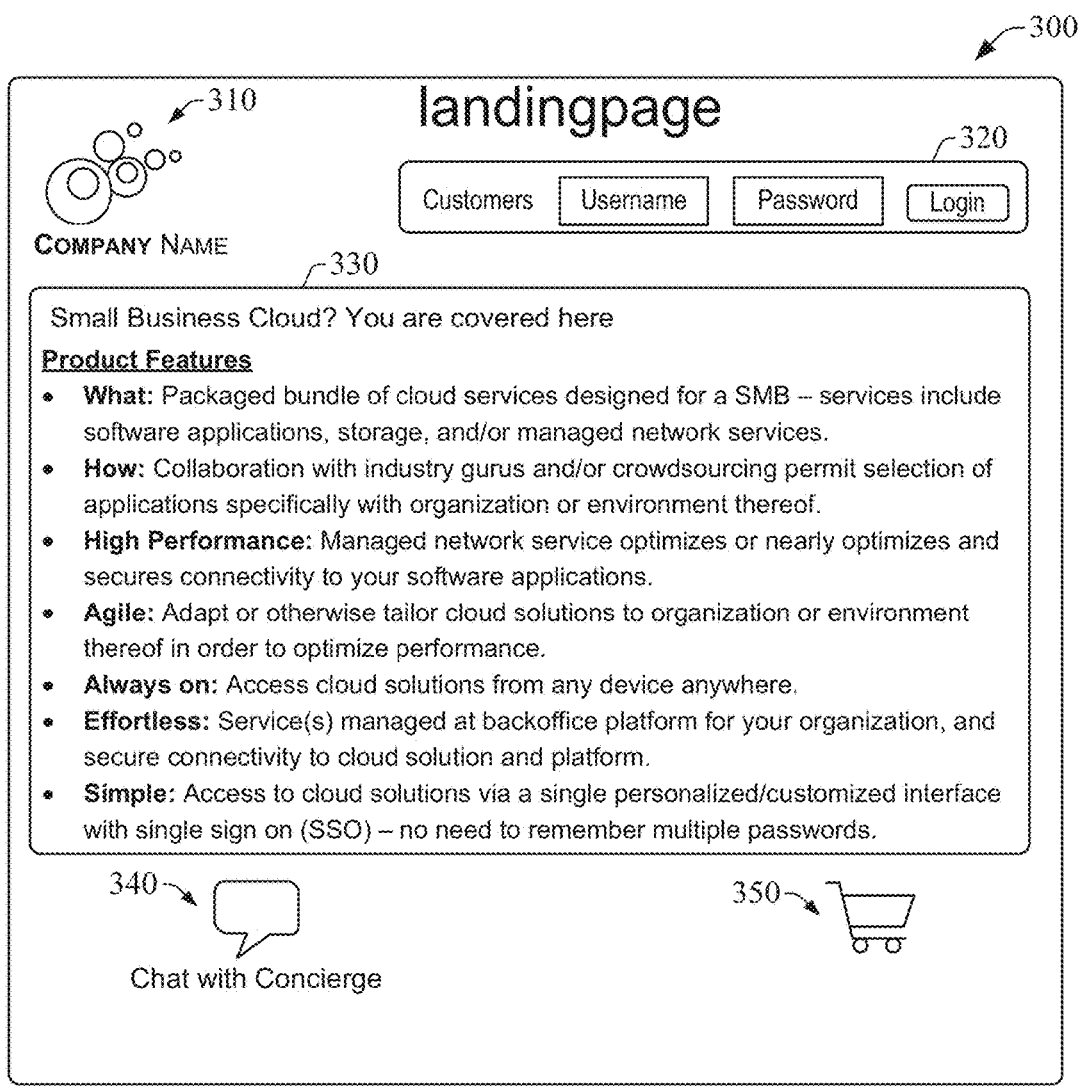
FIG. 3 illustrates an example landing webpage in accordance with one or more aspects of the disclosure.

FIG. 2 illustrates a block diagram of an example operational flow 200 of a cloud solution in accordance with one or more aspects of the disclosure. The landing page 210 can permit interaction with a sales platform. As illustrated, in one aspect, the landing page can permit establishing a chat with a sales representative. In addition, the landing page 210 can permit access to a platform to purchase a cloud solution. The landing page 210 also can permit to log in to a solution portal 220. As an illustration, a representation of an example landing webpage 300 is presented in FIG. 3. As illustrated, the landing webpage 300 can include branding indicia 310 associated with a business entity that utilizes a cloud solution in accordance with one or more aspects described herein. The landing webpage also can include interface elements 320 (also referred to, in certain scenarios, as indicia 320) that can permit input and delivery of credentials (e.g., username and password) that permit accessing a cloud solution. For example, such credentials can permit logging in to a service provider platform that can provide the cloud service. In addition, the landing webpage 300 can include indicia 330 that can convey information associated with one or more features of cloud solutions. Interface elements that can permit transactions with a service provider also can be included in the landing webpage 300. For example, interface elements 340 can permit, in response to actuation, communication with a representative of the service provider—such a representative may be referred to as "concierge"). For another example, indicia 350 can permit, in response to actuation, purchase of a specific cloud solution.

Figure 4:
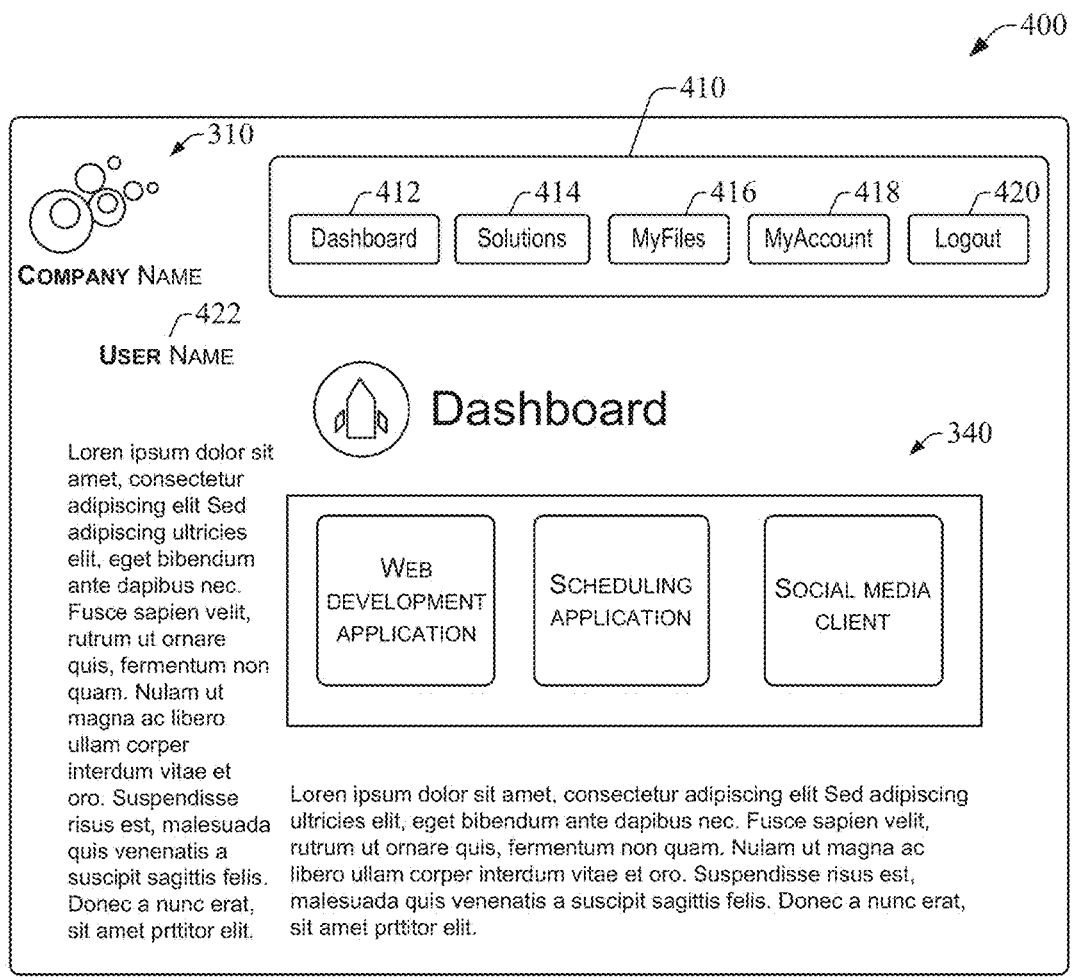
Figure 5:
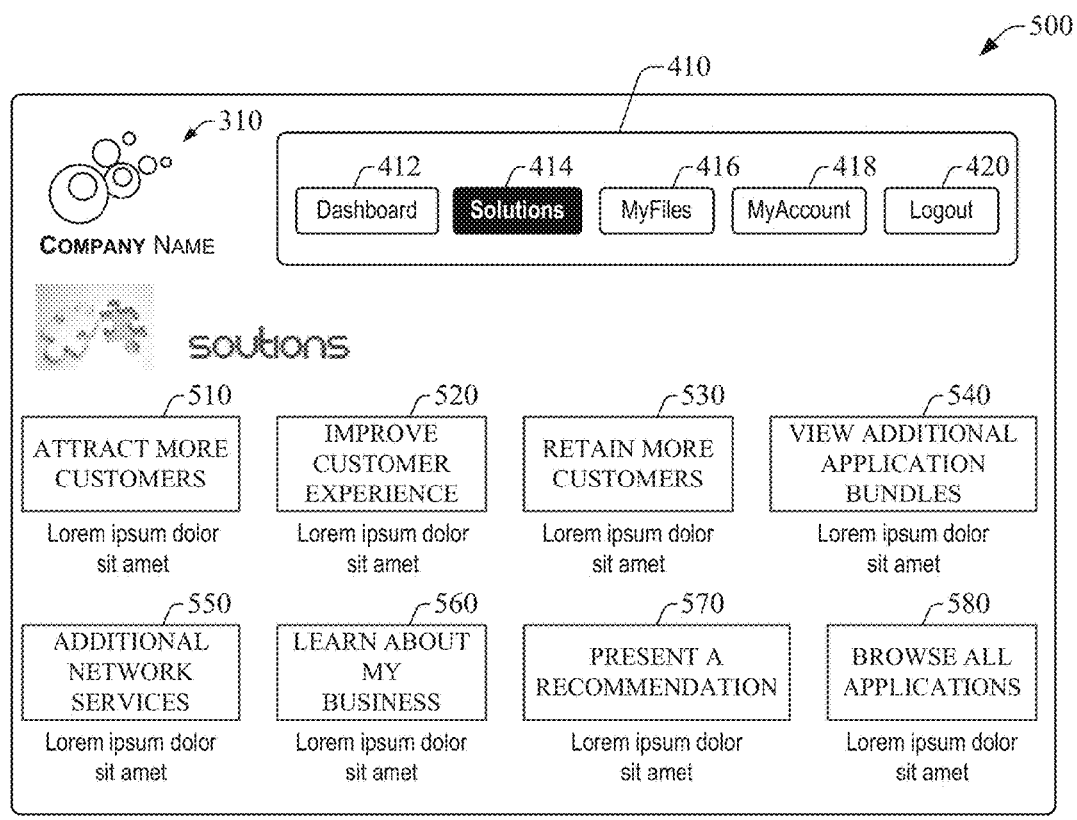
Figure 6:
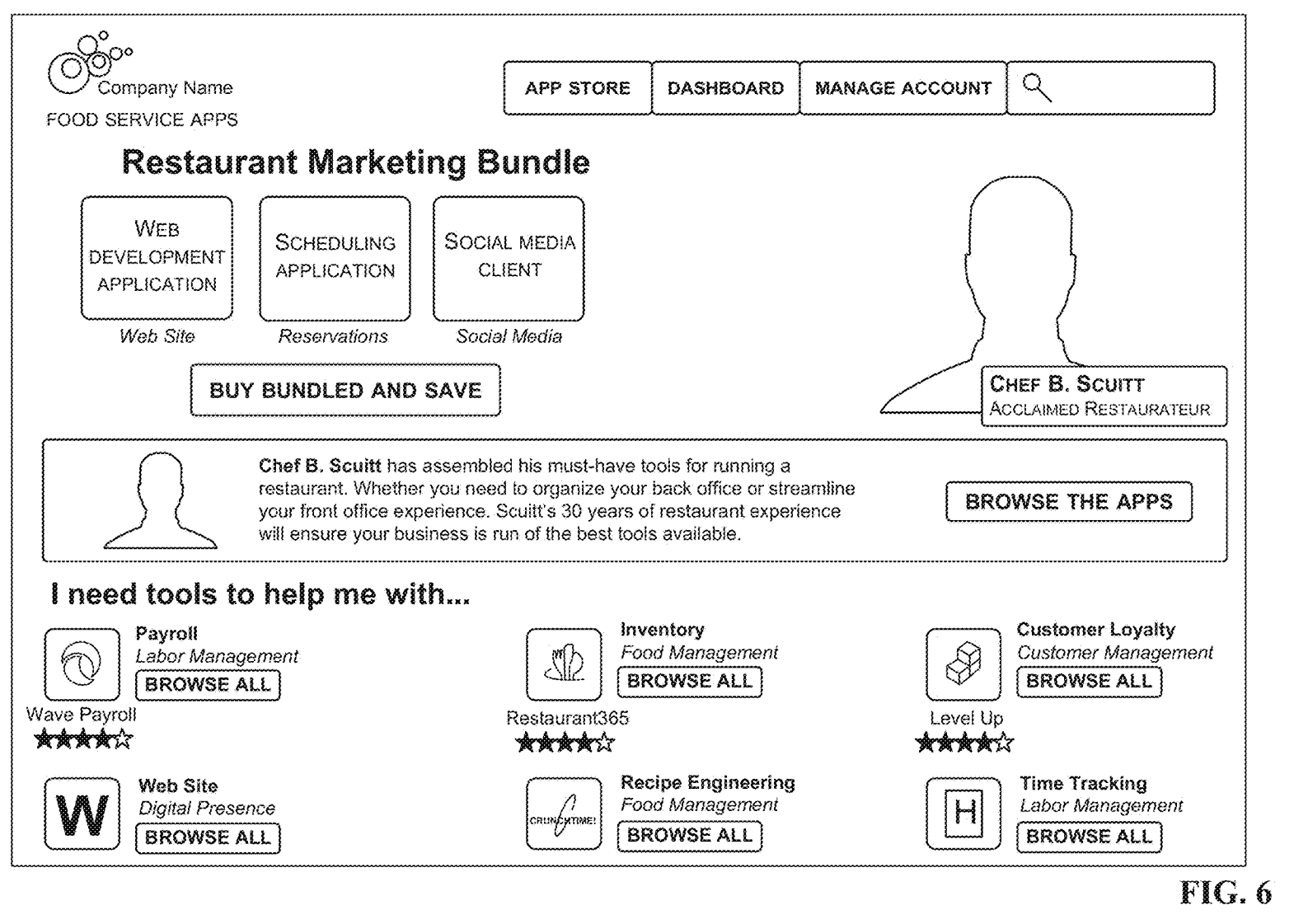

The solution portal 220 can permit access to various functionalities. In certain implementations, the solution portal 220 can comprise one or more consumption webpages. As an illustration, FIG. 4 is a representation of an example consumption webpage 400 in accordance with one or more aspects of the disclosure. The consumption webpage can include navigation indicia 410 that can permit access to various functionality and content associated with a cloud solution having a bundle of cloud services. As illustrated, the navigation indicia 410 can comprise navigation indicia 412 that, in response to actuation, for example, can permit access to content indicative of a group of cloud services 420 (e.g., software applications) that are available within the bundle of cloud services. Similar to branding of the example landing webpage 300, the consumption webpage 400 also may be personalized to a specific end-user that can access (e.g., can log in) into the cloud solution platform 150. The end-user can be represented with indicia 422. Such access or log in can be performed via single sign-on (SSO) the can permit access to other services provided by a service provider that administers or provide the cloud solution associated with the consumption webpage 400. As another illustration, FIG. 5 presents another example consumption webpage 500 that can be accessed via actuation of navigation indicia 414. The consumption webpage 500 can render the navigation block 410 and a group of access indicia 510-580 that can permit access to various solutions suitable to address specific organizational performance indicators (e.g., business needs). As yet another illustration, FIG. 6 presents yet another example consumption webpage that embodies a user interface to cloud services (e.g., software application(s)) in the food service industry. The user interface includes indicia (represented as "app store") that, in response to actuation or selection, permits access to a cloud solutions platform (e.g., platform 150) and a cloud solution therein. The user interface also includes indicia (represented as "dashboard") that, in response to actuation or selection, permit access to an interface that provides access to cloud services (e.g., software applications) available to an end-user or consumer associated with the interface. In addition, the user interface also includes indicia that, in response to actuation or selection, can permit management of an account associated with a consumer of a cloud solution associated with the interface. The user interface also presents software applications available to the an end-user, and include indicia that when actuated or otherwise selected can permit the end-user to browse various categories of cloud services (e.g., software solutions) and/or receive recommendation for cloud services in one or more of such categories.

In one aspect, the solution portal 220 can link to a management interface (e.g., a webpage) provided by the service provider, wherein such interface can provide various account management functionalities. In another aspect, the solution portal 220 can permit a link to a specific cloud service, such as a software application. As an example, the solution portal 220 can link to a cloud storage application 230, represented as consumer shared space 230. In yet another aspect, the solution portal 220 can link to a service provider customized solution interface (e.g., a webpage). In particular, yet not exclusively, the solution portal 220 can permit access to the solution engine 154, which can provide access to a group of cloud solutions that can address specific organizational needs. As described herein, the group of solutions can be identified through the solution search component 140. In the example operational flow 200, in one embodiment, the solution search component 140 can comprise several components that can search for specific cloud solution(s) according various performance drivers (e.g., organizational needs) of a business entity, such as a small business or medium business.

In one aspect, the solution search component 140 can include a component, referred to as an "Attract More Customers" component, that can provide search results containing one or more cloud services, such as software applications, which can be categorized as "Type 01" service(s), for example. In another aspect, the solution search component 140 can include a second component, referred to as an "Improve Customer Experience" component, that can provide search results containing one or more cloud services, such as software applications, which can be categorized as "Type 02" service(s), for example. In another aspect, the solution search component 140 can include a third component, referred to as a "Retain More Customers" component, that can provide search results containing one or more cloud services, such as software applications, which can be categorized as Type 03" service(s), for example. In addition or in the alternative, such informative search components can include a component, referred to as an "Additional Network Services" component, that can provide discrete network service value added "services."

In another aspect, the solution search component 140 can include one or more informative components that can provide information associated with available cloud solutions or one or more components thereof. Such informative components can include a component, referred to as a "View Additional Application Bundles" component, that can provide information indicative of custom-named bundle categories (see, e.g., App List). In certain embodiments, such information can be provided as a listing that can be rendered in a web-based interface, such as a dedicated webpage. In addition or in the alternative, the one or more informative components can include a component, referred to as a "Learn About My Business" component, that can provide information indicative of a list of free reports and/or value added reports. Moreover or as another alternative, the one or more informative components can include a component, referred to as a "Present a Recommendation" component, which can provide a recommendation of one or more cloud services, such as software applications.

In still another aspect, the solution search component 140 can include a component, referred to as a "Browse All Solution Elements" component, that can provide a data structure or metadata structure, e.g., a hypermedia link, which can reference a logical address of a standard storefront with cloud service(s) (e.g., one or more software applications) that may not be yet purchased.

Figure 7:
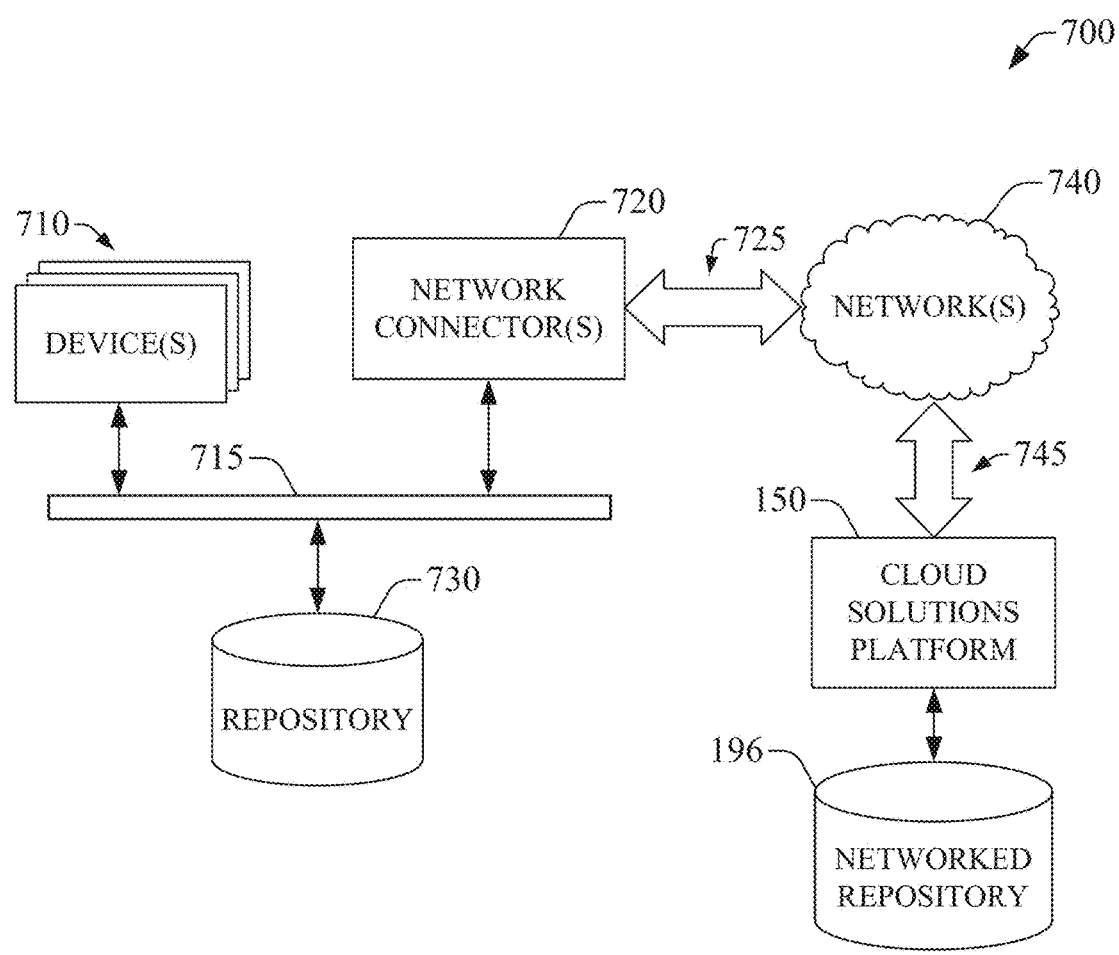
FIGS. 7-9 illustrate example operational environments in accordance with one or more aspects of the disclosure. The example operational environments in FIGS. 7 and 8 illustrate example infrastructure services (e.g., infrastructure and associated services) of disparate complexity, the infrastructure services can be provided in conjunction with other types of cloud services.

FIG. 7 is a block diagram of an example network environment 700 that can operate in accordance with one or more aspects of the disclosure. The operational network environment 700 can permit consumption of one or more cloud solutions in accordance with aspects of the disclosure. The network environment 700 can comprise one or more devices 710 (e.g., end-user devices or other user equipment, customer premises equipment, enterprise devices (such as servers, printers, etc.)) that can be functionally coupled to one or more network connectors 720 (e.g., routers, switches, combinations thereof, or the like) and a repository 730. It should be appreciated that while a single repository 730 is illustrated, additional or alternative embodiments contemplate presence of two or more repositories in various configurations, such as storage farms. In one embodiment, the one or more network connectors 720 can comprise a router with a firewall and additional functionality (which in certain scenarios may be referred to as intelligence) that can provide various infrastructure services—e.g., Internet browsing, email service, and the like.

As illustrated in the example network environment 700, at least one of the one or more network connector components 720 can be functionally coupled to a service provider network architecture via link(s) 725, which can comprise an uplink (UL) and a downlink (DL) for exchange of information (data, metadata, and/or signaling) between the network connector component(s) 720 and the cloud solutions platform 150. One or more links 745, which can comprise an UL and a DL, can permit connectivity between the service provider network architecture and/or other network elements of the network(s) 740, and the networked repository 196. The service provider network architecture can be contained within one or more networks 740. The service provider network architecture can be referred to as "service provider cloud." The link(s) 725 can comprise wireless link(s), wireline link(s), or combinations thereof. The network(s) 740, including the network provider cloud, can be embodied in or can comprise a wide area network having wireline functional elements (e.g., optic fibers, coaxial cables, routers, switches, gateways, combinations thereof, and the like) and/or wireless functional elements (such as functional elements contained in a terrestrial wireless network or a satellite-based wireless network).

Figure 8:
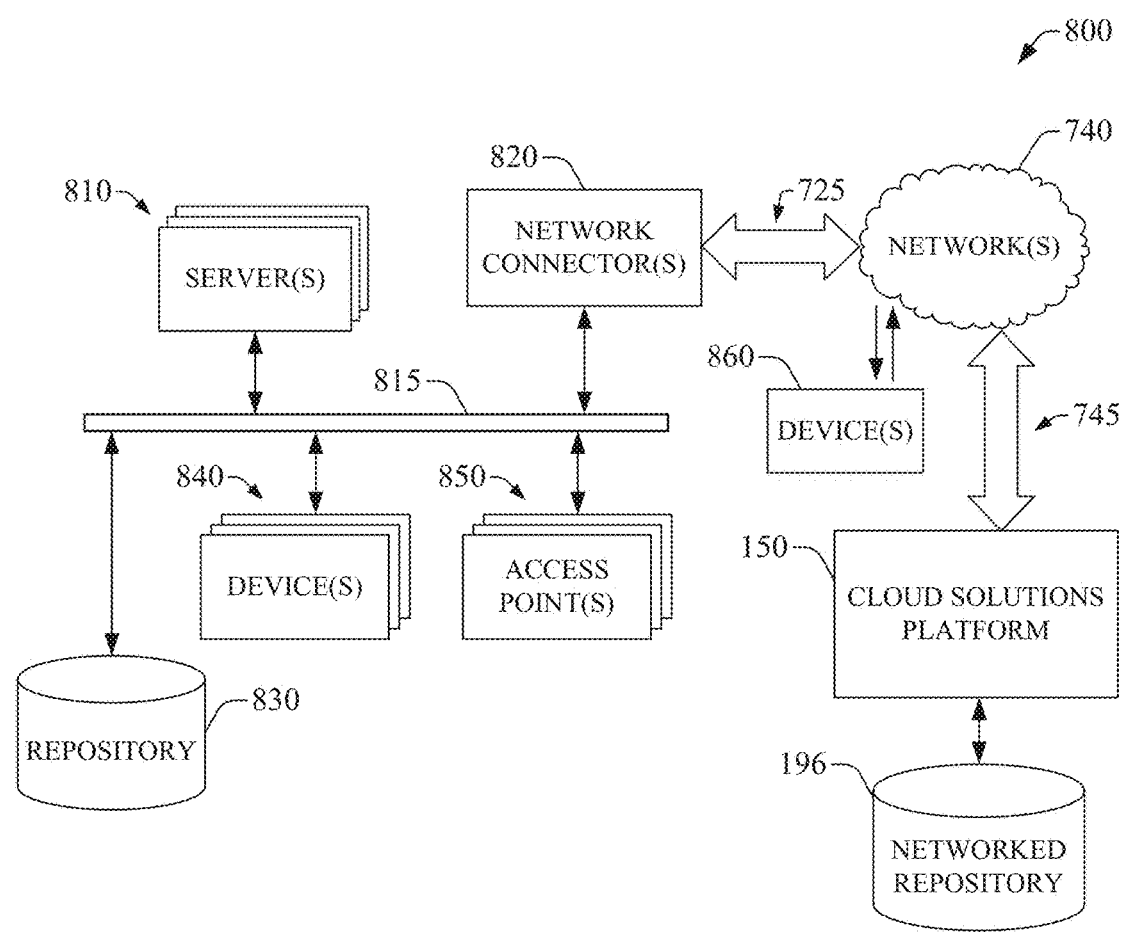

In certain embodiments, network environments that can operate in accordance with one or more aspects of the disclosure can have increased complexity. Such a complexity can be indicative or otherwise representative of a tier of a cloud solution, e.g., a degree of sophistication of the cloud solution or cloud service(s) associated therewith. FIG. 8 illustrates an example network environment 800 that can operate in accordance with one or more aspects of the disclosure, and can have increased complexity with respect to the example network environment 700. As illustrated the example network environment 800 can include one or more servers 810, one or more devices 840, one or more access points 850, and one or more network connector(s) 820. In one aspect, the network connector(s) 820 can be embodied in or can include a router that can be coupled to a wireless access point (AP) of the one or more access point(s) 850. In one aspect, the wireless AP can provide wireless service according to one or more radio technology protocols (e.g., WiFi, Third-Generation (3G) communications, Fourth-Generation (4G) communications, Long Term Evolution (LTE) communications, combinations thereof, or the like). In other embodiments, the router can be functionally coupled to two or more wireless APs that can provide two tiers of wireless service: (1) wireless service for members of an organization that utilizes a cloud solution of the disclosure, or (2) wireless service for visitors of an organization location.

In one embodiment, for example for a small restaurant, the business owner can purchase, as part of a bundle of cloud services, an infrastructure service. Such infrastructure service can comprise a router that is part of the network connector component(s) 720 (which also may be referred to as network connector(s) 720). In one aspect, the router can an integrated services router that can permit remote connectivity to the router via, for example, service provider network architecture which can be included within the one or more networks 740. In addition or in the alternative, the router can collect information indicative and/or representative of a cloud service available in the bundle of cloud services. Such information can embody or can comprise utilization information (e.g., usage data) and can permit, in one aspect, remote adjustment of configuration of the router. For instance, the adjustment can be directed to ensuring Wi-Fi service does not interfere with payment service(s), for example.

In certain embodiments, a router that is contained in the network connector(s) 820 can include a virtual private network (VPN) server that can permit, in one aspect, connectivity between a device 860 (either a mobile computing device or a non-mobile computing device) and the router. In certain embodiments, the router can include various functionality, such as anti-virus and/or anti-spam at the edge of the location of an organization (e.g., a business location). Thus, in one aspect, the router can detect any computers that may be connecting to the organization's LAN that may be infected with a virus or other malware.

Figure 9:
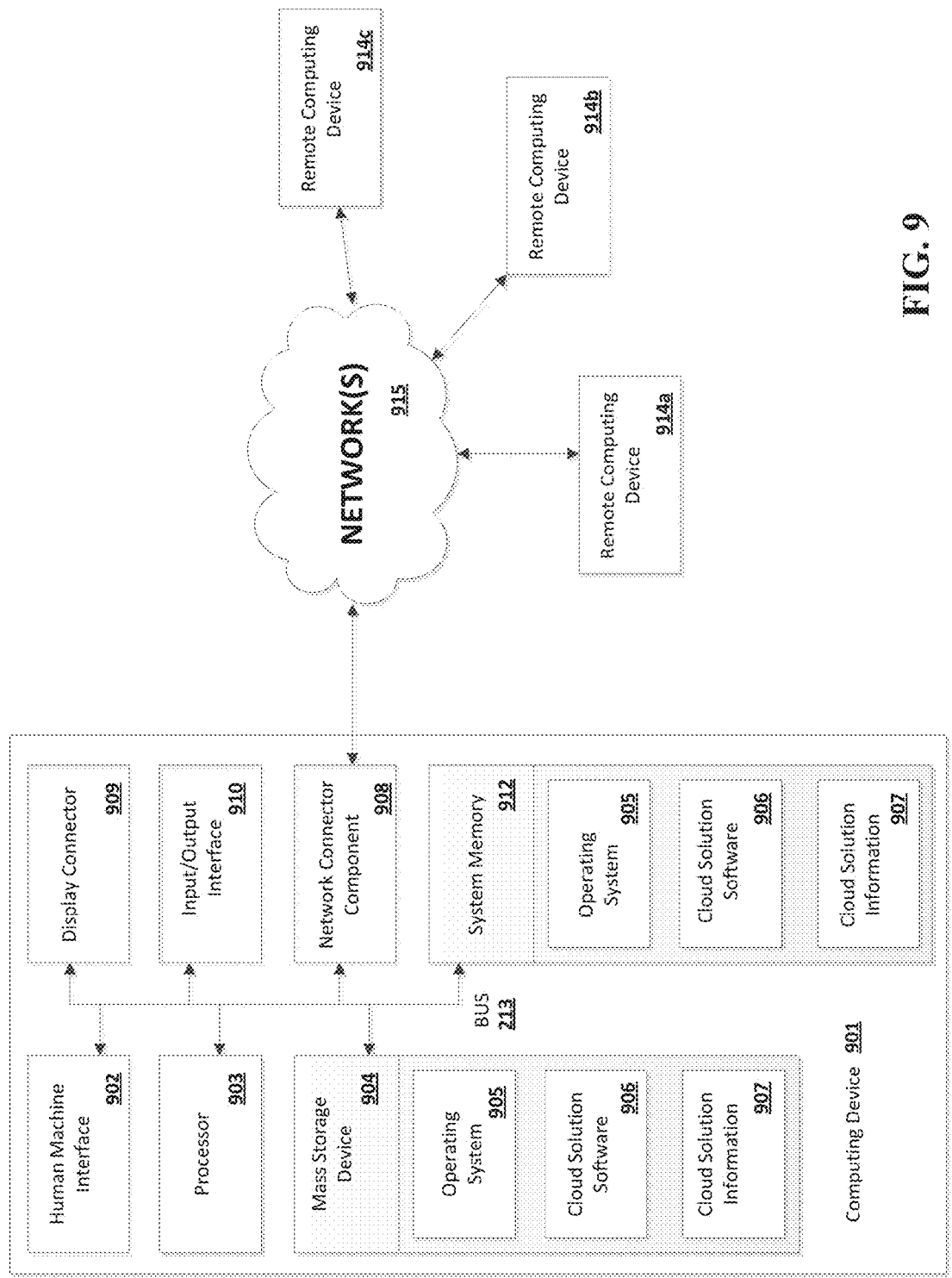

FIG. 9 is a high-level block diagram of an example operational environment 900 in accordance with one or more aspects of the disclosure. In one aspect, the functionality of the disclosure as provided in accordance with the methods, systems, and/or environments described herein can be implemented on a computing device 701 as described below. The example operational environment 100 for generation of a cloud solution, illustrated in FIG. 1, can be implemented in one or more computing devices embodied in or comprising the computing device 901. Similarly, the methods and systems disclosed can utilize one or more computers to perform one or more functions in one or more locations of an organization that consumes (e.g., composes, purchases, and/or utilizes) a cloud solution in accordance with one or more aspects of the disclosure. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 901. The components of the computing device 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, cloud solution software 906, cloud solution information 907, a network adapter 908, system memory 912, an Input/Output Interface 910, a display adapter 909, and a human machine interface 902, can be contained within one or more remote computing devices 914$a,b,c$ (e.g., devices 710) at physically separate locations, connected through buses of this form, in effect implementing a fully distributed system. In one aspect, the cloud solution software 906 can comprise a set of one or more computer-accessible instructions (e.g., computer-executable instructions, computer-readable instructions, combinations thereof, and the like) that can embody the various components described herein and, in response to execution by one or more processors, can implement the respective functionality in accordance with one or more aspects of the disclosure. In another aspect, the set of one or more computer-accessible instructions and/or at least a portion of the cloud solution information can configure at least one processor to operate in accordance with one or more aspects of the disclosure. In response to execution, in one aspect, the set of one or more computer-accessible instructions can cause a processor to operate in accordance with one or more aspects of the disclosure.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as cloud solution information 907 and/or program modules such as operating system 905 and cloud solution software 906 that are immediately accessible to and/or are presently operated on by the processing unit 903. In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and cloud solution software 906. Each of the operating system 905 and cloud solution software 906 (or some combination thereof) can comprise elements of the programming and the cloud solution software 906. Cloud solution information 907 can also be stored on the mass storage device 904. Cloud solution information 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, commands and information can be entered into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 903 (also referred as "processor 903") via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device (not shown) can also be connected to the system bus 913 via an interface, such as a display adapter 909. It is contemplated that the computer 901 can have more than one display adapter 909 and the computer 901 can have more than one display devices. For example, a display device can be a monitor, an LCD (Liquid Crystal Display), or a projector. In addition to a display device, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computing device 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computing device 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing device 901, and are executed by the data processor(s) of the computer. An implementation of cloud solution software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 10:
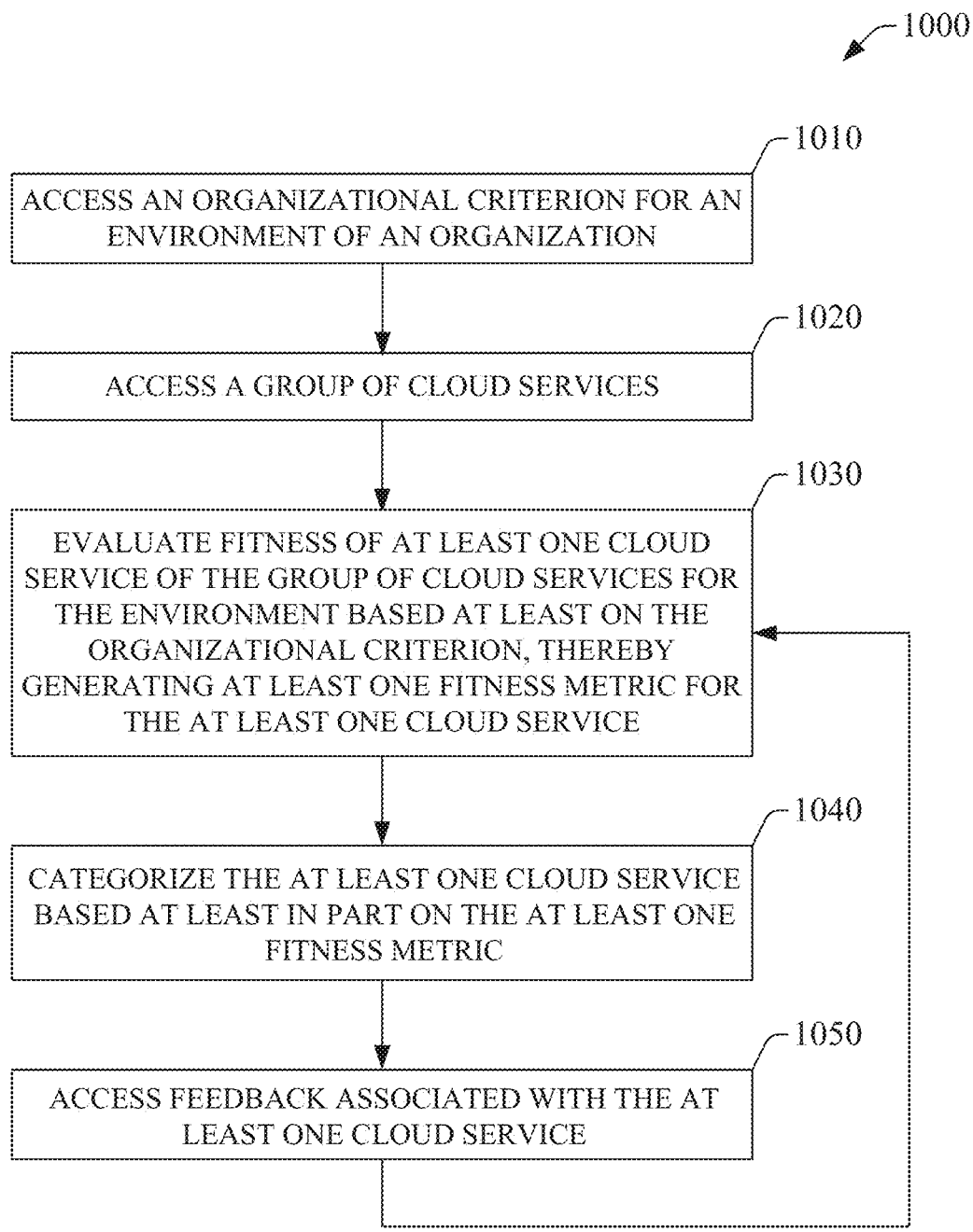
FIGS. 10-11 illustrate example methods in accordance with one or more aspects of the disclosure.
Figure 11:
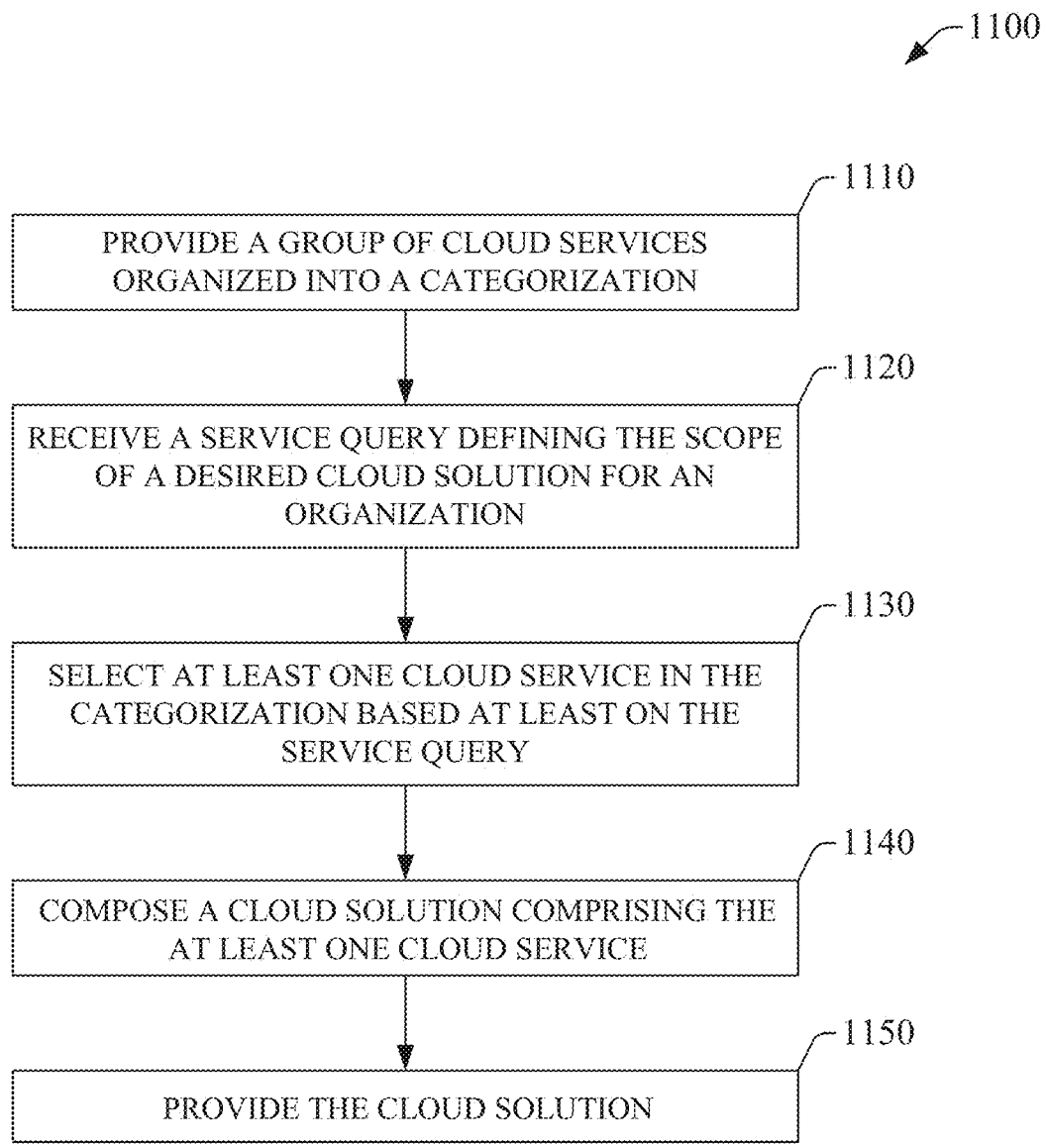

In view of the aspects described herein, example methods that can be implemented in accordance with the disclosure can be better appreciated with reference to the flowcharts in FIGS. 10-11. For purposes of simplicity of explanation, the example methods disclosed herein are presented and described as a series of blocks. However, it is to be understood and appreciated that the disclosed methods are not limited by the order of blocks and associated actions, as some blocks may occur in different orders and/or concurrently with other blocks from that shown and described herein. For example, the various methods or processes of the disclosure can be alternatively represented as a series of interrelated states or events, such as in a state diagram. Furthermore, not all illustrated blocks and associated action(s) may be required to implement a method in accordance with one or more aspects of the disclosure. Further yet, two or more of the disclosed methods or processes can be implemented in combination with each other, to accomplish one or more features or advantages described herein. At least a portion of the methods described herein can be implemented (e.g., configured (such as linked, compiled, a combination thereof, or the like); executed; configured and executed; or the like) by a system having at least one processor and at least one information storage devices (which also may be referred to as at least one memory device or at least one memory). Such a system can comprise one or more computing devices or one or more processors, and can be employed to execute computer-accessible instructions retained in a memory, or any computer-readable or machine-readable medium, to implement the methods described herein. The computer-accessible instructions can provide a computer-executable or machine-executable framework to implement the methods described herein.

It should be further appreciated that the example methods of the disclosure can be retained on an article of manufacture, or computer-readable medium, to permit or otherwise facilitate transporting and transferring such methods to a computing device (e.g., a desktop computer, a mobile computer, such as a tablet or a smartphone; a mobile telephone, a blade computer, a programmable logic controller, and the like) for execution, and thus implementation, by a processor of the computing device or for storage in a memory thereof.

FIG. 10 is a flowchart of an example method 1000 for curation of assets (e.g., cloud services) for cloud solutions in accordance with one or more aspects of the disclosure. In one embodiment, a system that has at least one processor can implement (e.g., configure, compile, link, execute, combinations thereof, or the like) one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method. In additional or alternative embodiments, a computing device that has at least one processor or is functionally coupled thereto can implement one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method.

At block 1010, an organizational criterion for an environment of an organization can be accessed. As described herein, the organization can be associated with an industry vertical and comprises a not-for-profit organization or a business organization. At block 1020, a group of one or more cloud services is accessed. At block 1030, fitness of at least one cloud service of the group of cloud services is evaluated for the environment based at least on the organizational criterion. Evaluating the fitness of the at least one cloud service in such a manner generates, in one aspect, at least one fitness metric for the at least one cloud service. In one aspect, evaluating the at least one cloud service comprises determining the alignment between an industry vertical associated with the organization and a cloud service of the at least one cloud service. In another aspect, evaluating the at least one cloud service can comprise determining the effectiveness of a cloud service of the at least one cloud service against an organizational need represented, at least in part, by the organizational criterion. In yet another aspect, evaluating the fitness of the at least one cloud service can comprise accessing information indicative of one or more business performance indicators associated with the accessed organizational criterion. As described herein, business performance indicators can be associated with specific business needs and can comprise mitigation of churn, reduction of operational costs, increment of revenue and/or profits, increment of market share or footprint, or the like. It should be appreciated that, in one aspect, evaluating fitness of a cloud service can include addressing at least the following (1) who is the cloud service intended for (e.g., type of organization), (2) which service scenario renders the cloud service a good candidate (e.g., a high-score service) for inclusion in a cloud solution (e.g., is the cloud service applicable to a restaurant, or is the cloud service applicable to a restaurant under certain specific environment); (3) what are the key features of the cloud service, and what are organizational criteria (e.g., business needs) that the cloud service may be matched to, and (4) what are organizational performance metrics are intended to be achieved.

At block 1040, the at least one cloud service can be categorized (e.g., indexed) based at least in part on the at least one fitness metric. In one aspect, categorizing the at least one cloud service can comprise generating an index of the least one cloud service. As described herein, the index can represent a ranking of the at least one cloud service in accordance with relevancy to the environment of the organization.

At block 1050, feedback associated with the at least one cloud service can be accessed. As described herein, in one aspect, accessing feedback can comprise receiving information indicative of utilization of a cloud service of the at least one cloud service. In another aspect, the feedback can comprise information indicative of revenue changes (e.g., revenue increment or revenue decrement) for an organization that utilizes the at least one cloud service within the environment associated with the organizational criterion or within a different environment. In response to accessing (e.g., collecting or otherwise receiving) the feedback, fitness of the at least one cloud service can re-evaluated based at least on the feedback information. In addition, based at least on the re-evaluation of the fitness of the at least one cloud service, the at least one fitness metric can be updated. Updated fitness metric(s) can be utilized or otherwise leveraged to further categorize the at least one cloud service.

FIG. 11 is a flowchart of an example method 1100 for generating a cloud solution in accordance with one or more aspects of the disclosure. The system or computing device that implements the example method 1000 also can implement the subject example method.

At block 1110, a group of one or more cloud services organized into a categorization can be provided. As described herein, such a group can be generated by a service provider, independently or in consultation with an industry guru; by a vendor; and/or by third-party developers. At block 1120, a service query can be received, where the service query can define the scope of a desired cloud solution for an environment of an organization. As described herein, in one aspect, the service query can be embodied in or can comprise an organizational criterion associated with the environment. At block 1130, at least one cloud service in the categorization can be selected or otherwise identified based at least on the service query. In one implementation, for the service query, the one or more cloud services can be selected based at least on one or more of an index indicative or otherwise representative the categorization, utilization information (e.g., usage data and/or usage metadata), or information indicative of end-user response to a cloud service (e.g., popularity of the cloud service or unpopularity of the cloud service). At block 1140, a cloud solution comprising the at least one cloud service can be composed.

At block 1150, the cloud solution can be provided. Providing the cloud solution can comprise generating or otherwise configuring a bundle of cloud services comprising the at least one cloud service.

In other embodiments, rather than providing the cloud solution, the example method 1000 can provide an offer for the cloud solution comprising the at least one cloud service. The offer can be tailored to the organization that supplies a service query for generation of the cloud solution, or to an operational environment of such organization. As described herein, the at least one cloud service can comprise at least one of a software application, a managed network service, or an infrastructure service.

While not illustrated, in certain embodiments, the example method 1000 can comprise a block at which the organization (e.g., a business entity) is billed for the cloud solution that is provided at block 1150. In one aspect, such a billing can be based at least in part on utilization of a cloud service of the at least one cloud service included in the cloud solution. In another aspect, the organization can be billed a fixed fee for the cloud solution. In yet another aspect, the organization can be billed based at least on the organization's revenue or profit generated by the cloud solution with respect to revenue or profit of the business entity during period(s) in which the cloud solution is not or has not been utilized. In still another aspect, the organization can be billed at a discounted rate or promotional rate for cloud solutions that include a cloud service with low popularity (as measured via collected feedback, for example) or that are provided on an experimental basis. For instance, a cloud solution having a cloud service (e.g., a software application or a professional service (such as a business service)) that is on beta testing may be billed at a discounted rate in order to entice an office of the organization (e.g., a business owner of the business entity) to test such a cloud service.

In additional or alternative embodiments, the example method 1100 can include a block at which feedback information associated with an environment of the organization can be accessed by the system and or computing device that implements the subject example method. In addition, in one or more of such embodiments, the subject example method also can include a block at which at least one second cloud service of the group of cloud services organized into the categorization can be selected by such a system based at least on the feedback information. Moreover, the system can compose a second cloud solution for the organization comprising the at least one second cloud service. Further, in such embodiments of the example method 1100, the system can include a block at which an offer for the second cloud solution is provided by the system.

As it would readily appreciated, various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having machine-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

At least some embodiments of the techniques in accordance with the disclosure are described with reference to block diagrams and flowchart illustrations of methods, computing devices, apparatuses and/or computer program products. It can be understood that each block of the block diagrams and flowchart illustrations, and combinations of blocks in the block diagrams and flowchart illustrations, respectively, can be implemented by machine-accessible instructions. In certain implementations (such as in the example computing environment described in connection with FIG. 9) the machine-accessible instructions may be loaded or otherwise incorporated into a general purpose computer, special purpose computer, or other programmable information processing apparatus to produce a particular machine, such that at least some or all of the operations or functions specified in the flowchart block or blocks can be implemented in response to execution at the computer or processing apparatus.

As it is employed in the subject disclosure, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Unless otherwise expressly stated, it is in no way intended that any technique, protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

What has been described herein in the present specification and drawings includes examples of systems, devices, and techniques that can provide the cloud solutions for an organization having specific operational requirements or preferences. It is, of course, not possible to describe every conceivable combination of components and/or methodologies for purposes of describing the various features of the disclosure, but one of ordinary skill in the art can recognize that many further combinations and permutations of the claimed subject matter are possible. Accordingly, it may be apparent that various modifications and/or variations can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive.

What is claimed is:

1. A method, comprising:
   receiving, by a system comprising at least one processor and at least one memory device, a service query defining a scope of a desired cloud solution for an organization, the service query comprising a first selection of a selectable first indication of a first performance target associated with a user and a second selection of a selectable second indication of a second performance target associated with the user;
   mapping, by the system, the first performance target to first cloud services having a defined degree of fitness for the first performance target, the first cloud services organized in a category and the defined degree of fitness associated with a performance change of the first performance target;
   mapping, by the system, the second performance target to second cloud services;
   and
   providing, by the system, to a user device, a cloud solution based on the first cloud services and the second cloud services, wherein providing comprises generating a service bundle having at least one first cloud service of the first cloud services and at least one second cloud service of the second cloud services.

2. The method of claim 1, the service bundle representing the cloud solution for the user, wherein the user is associated with an industry vertical and comprises a not-for-profit organization or a business organization, and
   the industry vertical comprising at least one of agriculture; education and childcare services; insurance services; Internet and online market services; retail and consumer services; utility services; banking and financial services; hospitality and travel services; legal services; law enforcement; media and entertainment; real estate and property services; transportation and logistics services; construction services; energy and environment services; healthcare and pharmaceutical services; manufacturing and engineering services; public-sector services; gastronomy services; or small businesses.

3. The method of claim 1, further comprising providing an offer for the cloud solution, wherein the at least one first cloud service comprises at least one of a software application, a managed network service, or an infrastructure service.

4. The method of claim 1, the method further comprising:
   identifying a first request to access the at least one first cloud service; and
   identifying a second request to access a networked storage resource, or a third request to access a computational resource.

5. The method of claim 1, further comprising accessing, by the system, feedback information associated with an environment of the user.

6. The method of claim 5, further comprising selecting, by the system, based at least on the feedback information, at least one third cloud service of the first cloud services; and
   composing, by the system, a second cloud solution for the user, the second cloud solution comprising the at least one third cloud service.

7. The method of claim 6, further comprising providing an offer for the second cloud solution.

8. The method of claim 4, further comprising billing the user for the cloud solution based at least in part on utilization of the at least one first cloud service.

9. A system, comprising:
   at least one memory device having at least computer-executable instructions stored thereon; and
   at least one processor functionally coupled to the at least one memory device and configured, by at least the computer-executable instructions, at least to:
   receive a service query defining a scope of a desired cloud solution for an organization, the service query comprising a first selection of a selectable first indication of a first performance target associated with a user and a second selection of a selectable second indication of a second performance target associated with the user;
   map the first performance target to first cloud services having a defined degree of fitness for the first performance target, the first cloud services organized in a category and the defined degree of fitness associated with a performance change of the first performance target;

map the second performance target to second cloud services; and provide, to a user device, a cloud solution based on the first cloud services and the second cloud services, wherein to provide comprises to generate a service bundle having at least one first cloud service of the first cloud services and at least one second cloud service of the second cloud services.

10. The system of claim 9, wherein the service bundle represents the cloud solution for the user, wherein the user is associated with an industry vertical and comprises a not-for-profit organization or a business organization, and the industry vertical comprising at least one of agriculture; education and childcare services; insurance services; Internet and online market services; retail and consumer services; utility services; banking and financial services; hospitality and travel services; legal services; law enforcement; media and entertainment; real estate and property services; transportation and logistics services; construction services; energy and environment services; healthcare and pharmaceutical services; manufacturing and engineering services; public-sector services; gastronomy services; or small businesses.

11. The system of claim 9, wherein the at least one processor is further configured to provide an offer for the cloud solution, wherein the at least one first cloud service comprises at least one of a software application, a managed network service, or an infrastructure service.

12. The system of claim 9, wherein the at least one processor is further configured to:

identify a first request to access to the at least one first cloud service; and identify a second request to access a networked storage resource, or a third request to access a computational resource.

13. The system of claim 9, wherein the at least one processor is further configured to access feedback information associated with an environment of the user.

14. The system of claim 13, wherein the at least one processor is further configured to select, based at least on the feedback information, at least one third cloud service of the first cloud services; and to compose a second cloud solution for the user, the second cloud solution comprising the at least one third cloud service.

15. The system of claim 14, wherein the at least one processor is further configured to provide an offer for the second cloud solution.

16. The system of claim 12, wherein the at least one processor is further configured to bill the user for the cloud solution based at least in part on utilization of the at least one first cloud service.

17. At least one computer-readable non-transitory storage medium having stored thereon computer-accessible instructions that, in response to execution, cause at least one processor to perform actions comprising:

receiving a service query defining a scope of a desired cloud solution for an organization, the service query comprising a first selection of a selectable first indication of a first performance target associated with a user and a second selection of a selectable second indication of a second performance target associated with the user;

mapping the first performance target to first cloud services having a defined degree of fitness for the first performance target, the first cloud services organized in a category and the defined degree of fitness associated with a performance change of the first performance target;

mapping the second performance target to second cloud services; and providing, to a user device, a cloud solution based on the first cloud services and the second cloud services, wherein causing to display comprises generating a service bundle having at least one first cloud service of the first cloud services and at least one second cloud service of the second cloud services.

18. The at least one computer-readable non-transitory storage medium of claim 17, wherein the service bundle represents the cloud solution for the user, and wherein the user is associated with an industry vertical and comprises a not-for-profit organization or a business organization, and the industry vertical comprising at least one of agriculture; education and childcare services; insurance services; Internet and online market services; retail and consumer services; utility services; banking and financial services; hospitality and travel services; legal services; law enforcement; media and entertainment; real estate and property services; transportation and logistics services; construction services; energy and environment services; healthcare and pharmaceutical services; manufacturing and engineering services; public-sector services; gastronomy services; or small businesses.

19. The method of claim 1, wherein mapping the first performance target to the first cloud services comprises identifying the first cloud services using a matrix associated with the first performance target.

20. The system of claim 9, wherein to map the first performance target to the first cloud services comprises to identify the first cloud services using a matrix associated with the first performance target.

* * * * *